United States Patent
Lee et al.

(10) Patent No.: US 12,366,633 B2
(45) Date of Patent: Jul. 22, 2025

(54) METHOD FOR CORRECTION OF REFLECTIVITY ON IDENTIFIED BRIGHT BAND BASED ON POLARIMETRIC OBSERVATIONS, RECORDING MEDIUM AND DEVICE FOR PERFORMING THE METHOD

(71) Applicant: KOREA METEOROLOGICAL ADMINISTRATION, Seoul (KR)

(72) Inventors: Jeong-Eun Lee, Gwangmyeong-si (KR); SooHyun Kwon, Seoul (KR); Sung-Hwa Jung, Seoul (KR)

(73) Assignee: KOREA METEOROLOGICAL ADMINISTRATION, Seoul (KR)

(*) Notice: Subject to any disclaimer, the term of this patent is extended or adjusted under 35 U.S.C. 154(b) by 376 days.

(21) Appl. No.: 17/862,786

(22) Filed: Jul. 12, 2022

(65) Prior Publication Data

US 2022/0397639 A1    Dec. 15, 2022

Related U.S. Application Data

(63) Continuation-in-part of application No. PCT/KR2022/004786, filed on Apr. 4, 2022.

(30) Foreign Application Priority Data

Jun. 15, 2021   (KR) .................. 10-2021-0077356

(51) Int. Cl.
*G01S 7/02* (2006.01)
*G01S 13/95* (2006.01)

(52) U.S. Cl.
CPC .............. *G01S 7/025* (2013.01); *G01S 13/95* (2013.01)

(58) Field of Classification Search
CPC .......... G01S 7/025; G01S 13/95; G01S 7/024; G01S 7/2926; G01S 7/2927; G01S 7/412; Y02A 90/10
See application file for complete search history.

(56) References Cited

U.S. PATENT DOCUMENTS 9,348,015 B2 * 5/2016 Lim ................ G01S 13/951

FOREIGN PATENT DOCUMENTS

| KR | 10-1255966 B1 | 4/2013 |
| KR | 10-1451548 B1 | 10/2014 |

(Continued)

OTHER PUBLICATIONS

Translation of Korean Patent Application Publication No. 102113673 B1. (Year: 2020).*

(Continued)

*Primary Examiner* — Whitney Moore
(74) *Attorney, Agent, or Firm* — Bridgeway IP Law Group, PLLC; Sang Ho Lee; Hyu Woo Shin

(57) ABSTRACT

A reflectivity correction method using a double polarization variable-based bright band detection result includes a preprocessing operation for correcting a double polarization variable observation error and calculating a depolarization ratio; a fuzzy classifier generation operation for calculating a weighting and a membership function of each characteristic variable using a bright band height extracted from a quasi-vertical profile generated from specific elevation angle data, a bright band detection operation for detecting a bright band using a depolarization ratio and a fuzzy classifier for each elevation angle, and a reflectivity correction operation for correcting reflectivity over-observation for a detected bright band region on the basis of a correction factor calculated using an apparent profile of reflectivity generated by averaging reflectivity data for the bright band region for (Continued)

each elevation angle. Thus, it is possible to improve the accuracy of precipitation estimation by using the corrected reflectivity.

18 Claims, 19 Drawing Sheets

(56) References Cited

FOREIGN PATENT DOCUMENTS

| KR | 10-1483617 B1 | 1/2015 |
|---|---|---|
| KR | 10-2101436 B1 | 4/2020 |
| KR | 10-2113673 B1 | 5/2020 |
| KR | 10-2221897 B1 | 3/2021 |
| WO | 2018/131787 A1 | 7/2018 |

OTHER PUBLICATIONS

Al-Sakka, H., A. Boumahmoud, B. Fradon, S. J. Frasier, and P. Tabary, 2013: A New Fuzzy Logic Hydrometeor Classification Scheme Applied to the French X-, C-, and S-Band Polarimetric Radars. J. Appl. Meteor. Climatol., 52, 2328-2344, https://doi.org/10.1175/JAMC-D-12-0236.1. (Year: 2013).*

Rico-Ramirez, M.A., Cluckie, I.D. and Han, D. (2005), Correction of the bright band using dual-polarisation radar. Atmosph. Sci. Lett., 6: 40-46. https://doi.org/10.1002/asl.89 (Year: 2005).*

Bringi, V.N, T.D Keenan, and V Chandrasekar. Correcting C-Band Radar Reflectivity and Differential Reflectivity Data for Rain Attenuation: A Self-Consistent Method with Constraints. IEEE transactions on geoscience and remote sensing 39.9 (2001):1906-1915. Web (Year: 2001).*

Will Hall, Miguel Angel Rico-Ramirez, Stefan Krämer, Classification and correction of the bright band using an operational C-band polarimetric radar, Journal of Hydrology, vol. 531, Part 2, 2015, pp. 248-258. (Year: 2015).*

Jae-Kyoung Lee et al., "Development of Radar-Based Multi-Sensor Quantitative Precipitation Estimation Technique", Atmosphere. Korean Meteorological Society vol. 24, No. 3 (2014) pp. 433-444, Korea Meteorological Administration, Weather Radar Center, Seoul, Korea.

* cited by examiner

Example of total membership value /
Temperature average profile

Definition of sector size and window size

Average profile of reflectivity ( AVPR )

Correction factor (CF)

METHOD FOR CORRECTION OF REFLECTIVITY ON IDENTIFIED BRIGHT BAND BASED ON POLARIMETRIC OBSERVATIONS, RECORDING MEDIUM AND DEVICE FOR PERFORMING THE METHOD

CROSS-REFERENCE TO RELATED APPLICATION(S)

The present application is a continuation-in-part of international patent application No. PCT/KR2022/004786 filed on Apr. 4, 2022, and claims priority to Korean patent application No. 10-2021-0077356 filed on Jun. 15, 2021, the entire contents of which are hereby incorporated by reference.

TECHNICAL FIELD

The present invention relates to a reflectance correction method using a double polarization variable-based bright band detection result, and a recording medium and an apparatus for performing the same, and more particularly, to a technique for detecting a bright band using fuzzy logic and a depolarization ratio, calculating a reflectivity correction factor through the generation of an apparent profile of reflectivity, and correcting the over-observation of reflectivity due to the bright band.

BACKGROUND ART

A bright band refers to a phenomenon in which reflectivity Z is over-observed by a laser beam passing through the melting layer where snow particles turn into rain particles while passing through a height corresponding to 0° C. Snow particles begin to melt near 0° C., and Z increases due to the change in permittivity.

The over-observation of Z due to bright bands causes overestimation in Z-based precipitation estimation. Therefore, bright bands should be detected and corrected for accurate precipitation estimation.

In most studies using a single-polarization radar, bright bands have been detected from a Z profile. Bright band detection based on the Z vertical structure has limitations in detecting bright bands in low elevation angle data, where non-weather echoes (topographic echo, etc.) are mixed and the bright bands do not appear in the form of concentric circles centered on the radar. Also, the bright band detection has a problem in that the use of bright bands near the ground is limited because the entire structure of the bright bands cannot be observed except in summer.

DISCLOSURE

Technical Problem

Accordingly, the technical solutions of the present invention have been conceived in this regard, and an object of the present invention is to provide a reflectivity correction method using a double polarization variable-based bright band detection result Another object of the present invention is to provide a recording medium having a computer program recorded thereon for performing a reflective correction method using a double polarization variable-based bright band detection result.

Still another object of the present invention is to provide an apparatus for performing the reflectivity correction method using a double polarization variable-based bright band detection result.

Technical Solution

In order to realize the above objects of the present invention, there is provided a reflectivity correction method using a double polarization variable-based bright band detection result, the reflectivity correction method including a preprocessing operation for correcting a double polarization variable observation error and calculating a depolarization ratio; a fuzzy classifier generation operation for analyzing double polarization variables in a bright band region and a non-bright band region using a bright band height extracted from a quasi-vertical profile generated from specific elevation angle data and calculating a weighting and a membership function of each characteristic variable; a bright band detection operation for detecting a bright band using a depolarization ratio and a fuzzy classifier for each elevation angle; and a reflectivity correction operation for correcting reflectivity over-observation for a detected bright band region on the basis of a correction factor calculated using an apparent profile of reflectivity generated by averaging reflectivity data for the bright band region for each elevation angle.

In an embodiment of the present invention, the preprocessing operation may include operations of correcting power loss due to blockage for reflectivity and differential reflectivity; performing rain attenuation correction on the reflectivity and differential reflectivity; correcting a cross-correlation coefficient using a signal-to-noise ratio (SNR); and calculating a depolarization ratio on the basis of the cross-correlation coefficient and the differential reflectivity.

In an embodiment of the present invention, the fuzzy classifier generation operation may include operations of generating a quasi-vertical profile from specific elevation angle data having a certain elevation angle or higher; extracting the bright band height from the generated quasi-vertical profile; distinguishing the bright band region and the non-bright band region on the basis of the extracted bright band height, and calculating a membership function MF of each characteristic variable from a normalized frequency distribution and determining a weighting from the membership function.

In an embodiment of the present invention, the bright band detection operation may include operations of calculating a total membership value indicating the degree of contamination due to the bright band of observation data using the weighting of each characteristic variable; determining the bright band using the total membership value and the depolarization ratio; removing a misdetected region using a total membership value profile generated by averaging, by height, the sectorwise total membership values on the basis of an azimuth at each elevation angle and a temperature average profile obtained by averaging, by height, the temperatures of the center of a radar beam; and smoothing a bright band detection result by applying a median filter.

In an embodiment of the present invention, the operation of determining the bright band may include an operation of identifying bright band candidates when a cross-correlation coefficient is less than or equal to a preset first threshold value and the total membership value exceeds a preset second threshold value and when the cross-correlation coefficient exceeds the first threshold value and the depolarization ratio is greater than or equal to a preset third threshold value.

In an embodiment of the present invention, the operation of determining the bright band may further include an operation of determining, among the bright band candidates, a bright band in which a signal-to-noise ratio (SNR) exceeds a preset fourth threshold value according to a distance from a radar, in which reflectivity exceeds a preset fifth threshold value, in which a temperature of an upper portion of the radar beam is less than a preset sixth threshold value, or in which a temperature of a lower portion of the radar beam exceeds a preset seventh threshold value.

In an embodiment of the present invention, the operation of removing the misdetected region comprises operations of generating a total membership value profile by averaging, by height, the sectorwise total membership values on the basis of an azimuth at each elevation angle and generating a temperature average profile by averaging, by height, the temperatures of the center of the radar beam; setting a height at which an average total membership value is maximum for a high elevation angle greater than or equal to a preset value as a reference height and setting a first height at which the average total membership value is less than a preset eighth threshold value as upper and lower heights of the bright band; and setting a height at which the average temperature is 0° C. for a low elevation angle less than a preset value as a reference height and setting the upper and lower heights of the bright band as heights which are higher or lower than the reference height by a preset height and at which the total membership value average is less than the eighth threshold value.

In an embodiment of the present invention, the operation of removing the misdetected region may further include an operation of resetting the upper height when the average temperature is below zero at a specific distance and the maximum value of the average total membership values is less than the eighth threshold value within a height at which the average temperature is in a certain range regardless of elevation angles.

In an embodiment of the present invention, the reflectivity correction operation may further include operations of generating an apparent profile of reflectivity by averaging the reflectivity data of the bright band region when a ratio of a bright band echo to a precipitation echo for each elevation angle is greater than or equal to a certain ratio; calculating reflectivity slopes for a region between an upper portion of the bright band and a peak, a region between the peak and a lower portion, and a region between the upper portion and the lower portion as a function of height from the apparent profile; calculating a reflectivity correction factor on the basis of the peak of the bright band for a region detected as the bright band; calculating a reflectivity correction value, which is the difference between observed reflectivity and corrected reflectivity, on the basis of the calculated correction factor; and applying the calculated correction value to the observed reflectivity.

In an embodiment of the present invention, the reflectivity correction method may further include a result storage operation for storing corrected reflectivity and a reflectivity correction value.

In order to realize another object of the present invention, there is provided a computer-readable storage medium according to an embodiment in which a computer program for performing a reflectivity correction method using a double polarization variable-based bright band detection result.

In order to realize still another object of the present invention, there is provided a reflectivity correction apparatus using a double polarization variable-based bright band, the reflectivity correction apparatus including a preprocessing unit configured to correct a double polarization variable observation error and calculate a depolarization ratio; a fuzzy classifier generation unit configured to generate a membership function and a weighting of each characteristic variable using a bright band height extracted from a quasi-vertical profile generated from specific elevation angle data; a bright band detection unit configured to detect a bright band using the depolarization ratio and a total membership value for each elevation angle; and a reflectivity correction unit configured to correct reflectivity over-observation for a detected bright band region on the basis of a correction factor calculated using an apparent profile of reflectivity generated by averaging reflectivity data for the bright band region for each elevation angle.

In an embodiment of the present invention, the preprocessing unit may include a beam blockage correction unit configured to correct power loss due to blockage for reflectivity and differential reflectivity; a rain attenuation correction unit configured to perform rain attenuation correction on the reflectivity and differential reflectivity; a $\rho_{hv}$ correction unit configured to correct a cross-correlation coefficient using a signal-to-noise ratio (SNR); and a $D_r$ calculation unit configured to calculate the depolarization ratio on the basis of the cross-correlation coefficient and the differential reflectivity.

In an embodiment of the present invention, the fuzzy classifier generation unit may include a QVP generation unit configured to generate a quasi-vertical profile from specific elevation angle data having a certain elevation angle or higher; a bright band height extraction unit configured to extract a bright band height from the generated quasi-vertical profile; a bright band identification unit configured to distinguish a bright band region and a non-bright band region on the basis of the bright band height; and a weighting determination unit configured to calculate a membership function (MF) of each characteristic variable from a normalized frequency distribution and determine a weighting from the membership function.

In an embodiment of the present invention, the bright band detection unit may include a total membership value calculation unit configured to calculate a total membership value indicating the degree of contamination due to a bright band of observation data using the weighting of each characteristic variable; a bright band determination unit configured to determine the bright band using the total membership value and the depolarization ratio; a misdetection removal unit configured to remove a misdetected region using a total membership value profile generated by averaging, by height, sectorwise total membership values on the basis of an azimuth at each elevation angle and a temperature average profile obtained by averaging, by height, temperatures of the center of a radar beam; and a smoothing unit configured to smooth a bright band detection result by applying a median filter.

In an embodiment of the present invention, the bright band determination unit may be configured to identify bright band candidates when a cross-correlation coefficient is less than or equal to a preset first threshold value and the total membership value exceeds a preset second threshold value and when the cross-correlation coefficient exceeds the first threshold value and the depolarization ratio is greater than or equal to a preset third threshold value.

In an embodiment of the present invention, the bright band determination unit may be configured to determine, among the bright band candidates, a bright band in which a signal-to-noise ratio (SNR) exceeds a preset fourth threshold value according to a distance from a radar, in which reflectivity exceeds a preset fifth threshold value, in which a temperature of an upper portion of the radar beam is less than a preset sixth threshold value, or in which a temperature of a lower portion of the radar beam exceeds a preset seventh threshold value.

The misdetection removal unit may be configured to generate a total membership value profile by averaging, by height, the sectorwise total membership values on the basis of an azimuth at each elevation angle and generating a temperature average profile by averaging, by height, the temperatures of the center of the radar beam; set a height at which an average total membership value is maximum for a high elevation angle greater than or equal to a preset value as a reference height and set a first height at which the average total membership value is less than a preset eighth threshold value as upper and lower heights of the bright band; set a height at which the average temperature is 0° C. for a low elevation angle less than a preset value as a reference height and set the upper and lower heights of the bright band as heights which are higher or lower than the reference height by a preset height and at which the total membership value average is less than the eighth threshold value; and reset the upper height when the maximum of the average total membership value is less than the eighth threshold value and the average temperature is below zero within a height at which the average temperature is in a certain range regardless of elevation angles.

In an embodiment of the present invention, the reflectivity correction unit may include a profile generation unit configured to generate an apparent profile of reflectivity by averaging the reflectivity data of the bright band region when a ratio of a bright band echo to a precipitation echo for each elevation angle is greater than or equal to a certain ratio; a variation calculation unit configured to calculate reflectivity slopes for a region between an upper portion of the bright band and a peak, a region between the peak and a lower portion, and a region between the upper portion and the lower portion as a function of height from the apparent profile; a correction factor calculation unit configured to calculate a reflectivity correction factor on the basis of the peak of the bright band for a region detected as the bright band; a correction value calculation unit configured to calculate a reflectivity correction value, which is the difference between observed reflectivity and corrected reflectivity, on the basis of the calculated correction factor; and a correction value application unit configured to apply the calculated correction value to the observed reflectivity.

In an embodiment of the present invention, the reflectivity correction apparatus using the double polarization variable-based bright band detection result may further include a result storage unit configured to store corrected reflectivity and a reflectivity correction value.

Advantageous Effects

According to the reflectivity correction method using the double polarization variable-based bright band detection result, the degree of bright band contamination is calculated using fuzzy logic by analyzing the characteristics of double polarization variables of a bright band, and a reflectivity correction factor is calculated using an apparent profile of reflectivity for the detected bright band. Therefore, it is possible to correct over-observed reflectivity data by detecting grid-based bright bands in radar volume data, and it is possible to improve the accuracy of precipitation estimation by using the corrected reflectivity.

MODE FOR CARRYING OUT THE INVENTION

Figure 1:
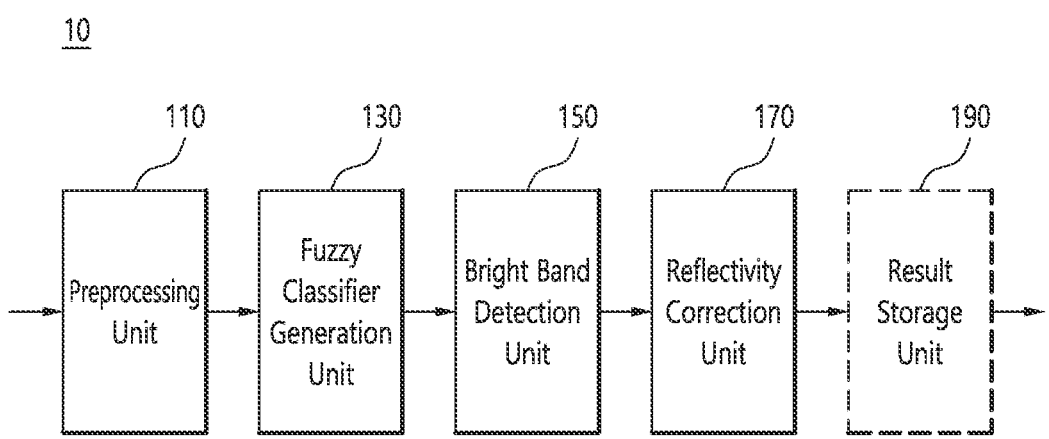
FIG. 1 is a block diagram of a reflectivity correction apparatus using a double polarization variable-based bright band detection result according to an embodiment of the present invention.

In the following detailed description of the present invention, references are made to the accompanying drawings that show, by way of illustration, specific embodiments in which the invention may be practiced. These embodiments are described in sufficient detail to enable those skilled in the art to practice the present invention. It is to be understood that the various embodiments of the invention, although different from each other, are not necessarily mutually exclusive. For example, a particular feature, structure or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar elements throughout the several views.

The term "unit" is defined herein as having its broadest definition to ordinary skill in the art to refer to software including instructions executable in a non-transitory computer-readable medium that would perform the associated function when executed, a circuit designed to perform the associated function, hardware designed to perform the associated function, or a combination of software, a circuit, or hardware designed to perform the associated function.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, block diagrams of the present specification illustrate a conceptual aspect of an illustrative circuit for embodying a principle of the present disclosure. Therefore, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute software in connection with appropriate software as well as dedicated hardware. When the functions are provided by the processors, they may be provided by a single dedicated processor, a single shared processor, or a plurality of individual processors, and some of them may be shared with each other.

In addition, the explicit use of terms presented as the processor, control, or similar concepts should not be interpreted exclusively by quoting hardware capable of executing software, but should be understood to implicitly include, without limitation, digital signal processor (DSP) hardware, a ROM for storing software, a RAM, and a non-volatile memory. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a method demanded by the claims in the present disclosure defined by the claims, any means capable of providing these functions are equivalent to means recognized from the present specification.

Hereinafter, exemplary embodiments of the present invention will be described in detail with reference to the drawings.

FIG. 1 is a block diagram of a reflectivity correction apparatus using a double polarization variable-based bright band detection result according to an embodiment of the present invention.

A reflectivity correction apparatus 10 (hereinafter referred to as an apparatus) using a double polarization variable-based light band detection result according to the present invention provides a technique for detecting a bright band by adding a depolarization ratio calculated using a double polarization variable to a fuzzy classifier and correcting reflectivity over-observed in a bright band region using an apparent profile of reflectivity.

Referring to FIG. 1, the apparatus 10 according to the present invention includes a preprocessing unit 110, a fuzzy classifier generation unit 130, a bright band detection unit 150, and a reflectivity correction unit 170. The apparatus 10 may further include a result storage unit 190.

In the apparatus 10 of the present invention, software (application) for performing reflectivity correction using a double polarization variable-based bright band detection result may be installed and executed. The configuration of the preprocessing unit 110, the fuzzy classifier generation unit 130, the bright band detection unit 150, the reflectivity correction unit 170, and the result storage unit 190 may be controlled by the software executed by the apparatus 10 to perform reflectivity correction using the double polarization variable-based bright band detection result.

The apparatus 10 may be a separate terminal or a part of a terminal. Also, the configuration of the preprocessing unit 110, the fuzzy classifier generation unit 130, the bright band detection unit 150, the reflectivity correction unit 170, and the result storage unit 190 may be formed as an integrated module or one or more modules. However, on the contrary, each element may be formed as a separate module.

The apparatus 10 may be movable or fixed. The apparatus 10 may be in the form of a server or an engine and may be referred to by other terms such as a device, an apparatus, a terminal, user equipment (UE), a mobile station (MS), a wireless device, and a handheld device.

The apparatus 10 may execute or produce various software programs based on an operating system (OS), that is, a system. The operating system is a system program for enabling software to use hardware of a device, and may include all mobile computer operating systems including Android OS, iOS, Windows mobile OS, Bada OS, Symbian OS and Blackberry OS and all computer operating systems including Windows, Linux, Unix, MAC, AIX, HP-UX, etc.

The preprocessing unit 110 corrects a double polarization variable observation error and calculates a depolarization ratio.

When a radar observes snow particles melting in the melting layer, Z increases due to permittivity, and differential reflectivity related to the shape of hydrometeors increases. A cross-correlation coefficient $\rho_{hv}$ related to the homogeneity of the types of hydrometeors in the observation volume of radar beams and a linear depolarization ratio (LDR) related to the axis ratio of the hydrometeors are also a radar observation variables useful for bright band detection.

A special observation strategy that transmits only one polarization mode is required to observe LDR variables, and thus a commercial double polarization radar that performs simultaneous transmission and receiving (STAR) of horizontal polarization and vertical polarization cannot acquire LDR data.

Recently, a depolarization ratio $D_r$ is calculated using $\rho_{hv}$ and $Z_{DR}$ data, which are variables observable in a radar operated in STAR mode and is used, instead of the LDR variable, for quality management, bright band detection, hail detection, and snow particle shape classification. Accordingly, the present invention uses Z, $Z_{DR}$, $\rho_{hv}$, and $D_r$ as characteristic variables of a fuzzy classifier and performs a preprocessing process for correcting observation errors for each variable.

Figure 2:
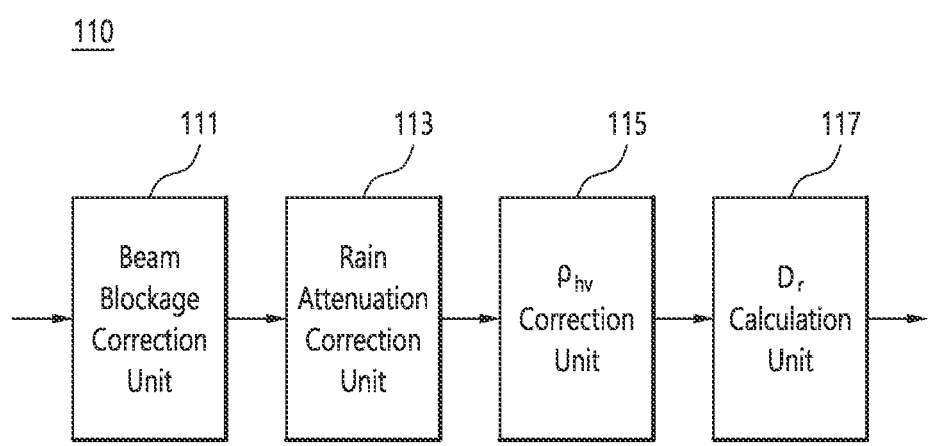
FIG. 2 is a detailed block diagram of a preprocessing unit of FIG. 1.

Referring to FIG. 2, the preprocessing unit 110 according to an embodiment of the present invention may include a beam blockage correction unit 111, a rain attenuation correction unit 113, a $\rho_{hv}$ correction unit 115, and a $D_r$ calculation unit 117.

The beam blockage correction unit 111 and the rain attenuation correction unit 113 correct reflectivity loss due to partial beam blockage and rain attenuation with respect to reflectivity Z and differential reflectivity $Z_{DR}$, which are data observed by a radar. A blockage ratio refers to a power loss ratio due to blockage and was calculated by assuming beam refraction and a Gaussian beam pattern in the standard atmosphere using a digital height model (DEM) data with a resolution of about 30 meters horizontally (BBF=1 means complete loss). Correction values of Z and $Z_{DR}$ for each observation error may be calculated as in Equations 1 and 2 below.

Beam Blockage:

$$\Delta Z_{H,blockage} = -10 \log_{10}(1-BBF), BBF=\text{Blockage Rate} \quad \text{[Equation 1]}$$

Rain Attenuation:

$$\Delta Z_{H,attenuation} = 2\sum_{i=1}^{n} A_i \quad \text{[Equation 2]}$$

$$A = 3.348 \times 10^{-6} Z_H^{0.755}$$

$$\Delta Z_{DR} = \Delta Z_{DR} * 0.22$$

$\rho_{hv}$ is affected by noise caused by radar receivers, waveguides, antennas, etc. The $\rho_{hv}$ correction unit 115 may use a signal to noise ratio (SNR) as shown in Equation 3 below to correct $\rho_{hv}$ biased by noise.

$$\rho_{hv} = \rho_{hv}^{(m)} \left(1 + \frac{1}{snr}\right) \quad \text{[Equation 3]}$$

Here, $\rho_{hv}^{(m)}$ is the observed $\rho_{hv}$, $\rho_{hv}$ is the corrected $\rho_{hv}$, and snr refers to the SNR ($=\rho_{hv}=10^{0.1SNR}$(dB)) in a linear unit. In particular, in the snow echo with a low SNR, $\rho_{hv}$ of 0.98 or less degrades bright band detection performance and should be corrected.

The $D_r$ calculation unit 117 calculates a depolarization ratio on the basis of a cross-correlation coefficient and differential reflectivity. $D_r$ may be calculated as in Equation 4 below using $\rho_{hv}$ and $Z_{DR}$ data of the radar operated in STAR mode.

$$D_r = \frac{1 + Z_{dr}^{-1} - 2\rho_{hv} Z_{dr}^{-1/2}}{1 + Z_{dr}^{-1} + 2\rho_{hv} Z_{dr}^{-1/2}} \quad \text{[Equation 4]}$$

Here, $Z_{dr}$ refers to differential reflectivity in a linear unit.

Figure 3:
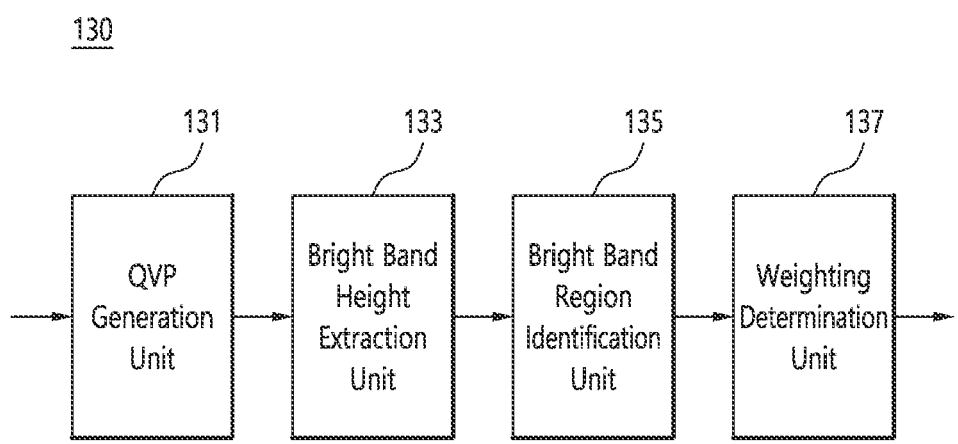
FIG. 3 is a detailed block diagram of a fuzzy classifier generation unit of FIG. 1.

The fuzzy classifier generation unit 130 generates a weighting and a membership function by using the distribution of double polarization variables in a bright band height extracted in a quasi-vertical profile. Referring to FIG. 3, the fuzzy classifier generation unit 130 may include a QVP generation unit 131, a bright band height extraction unit 133, a bright band region identification unit 135, and a weighting determination unit 137.

In general, Z and $\rho_{hv}$ images for low elevation angles (e.g., 0.7°) and high elevation angles (e.g., 7.5°) may be compared as follows. At high elevation angles, bright band boundaries are clearly identified in both Z and $\rho_{hv}$ regions, and the bright band boundary in the $\rho_{hv}$ image is somewhat narrower than the bright band boundary in the reflectivity region. At low elevation angles, it is difficult to identify the bright band boundary in the Z image, whereas the bright band boundary appears clearly in the $\rho_{hv}$ image.

The QVP generation unit 131 generates the quasi-vertical profile using data of high elevation angles at which bright bands appear as concentric circles centered on the radar, and then analyzes characteristic variables in the bright band region and the non-bright band region. The bright band characteristic analysis result may be used as training data for generating a fuzzy classifier.

In an embodiment, a quasi-vertical profile QVP generated from 7°-height-angle data was used to analyze bright band characteristics for generating a fuzzy classifier. The quasi-vertical profile is a technique for analyzing the vertical structure of a precipitation system by averaging the double polarization variables in the azimuth direction at a specific elevation angle. Using high elevation angles is advantageous for the vertical structure analysis of precipitation systems by minimizing the noise of double polarization variables. The bright band height extraction unit 133 may detect a bright band using a coordinate system rotation method and a quasi-vertical profile for each double polarization variable.

As a result, the peak of the bright band (approximately 4.5 km) was located at the maximum or minimum value of the double polarization variable in the quasi-vertical profile. In the bright band region, $\rho_{hv}$ was as low as 0.97 or less, and $D_r$ showed a value of −20.0 dB or more.

Figure 4:
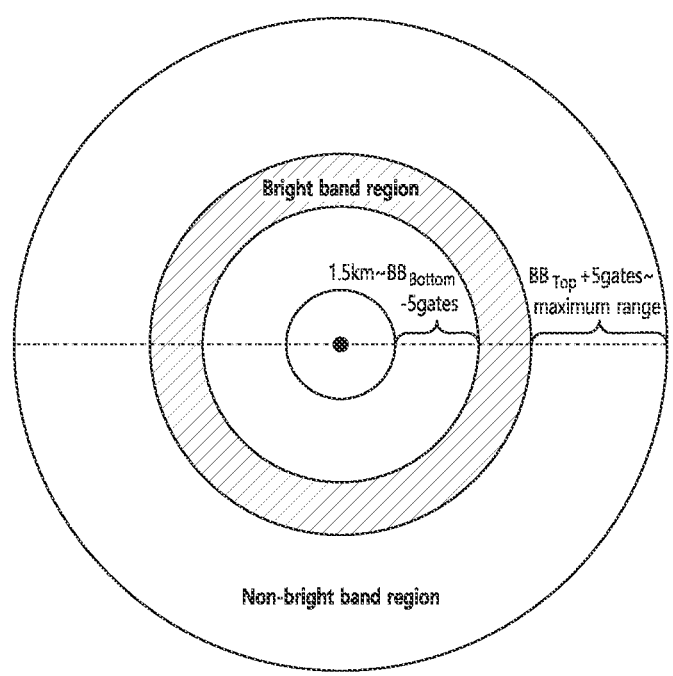
FIG. 4 is a diagram illustrating the definition of a bright band region and a non-bright band region.
Figure 5A:
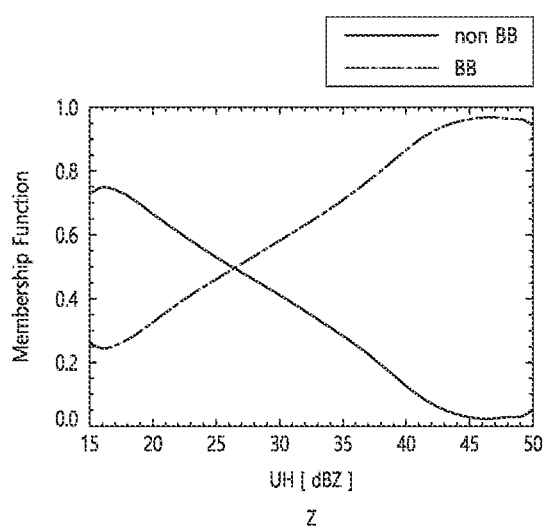
FIGS. 5A-5D are diagrams illustrating a membership function for each characteristic variable in the bright band region and the non-bright band region.
Figure 5B:
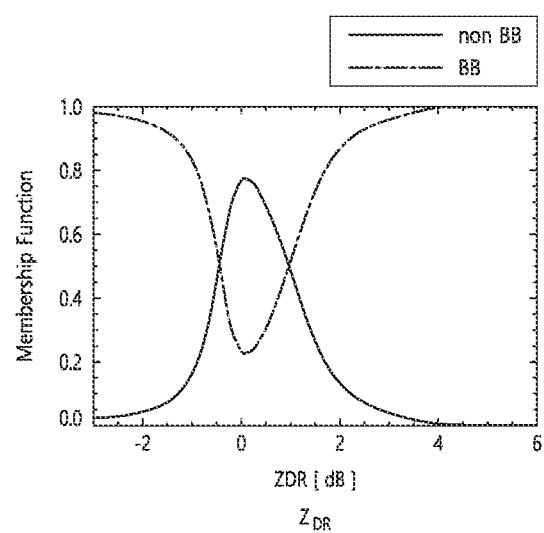
Figure 5C:
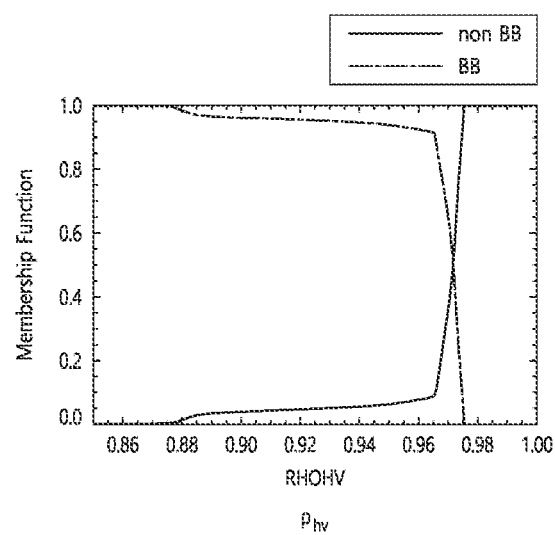
Figure 5D:
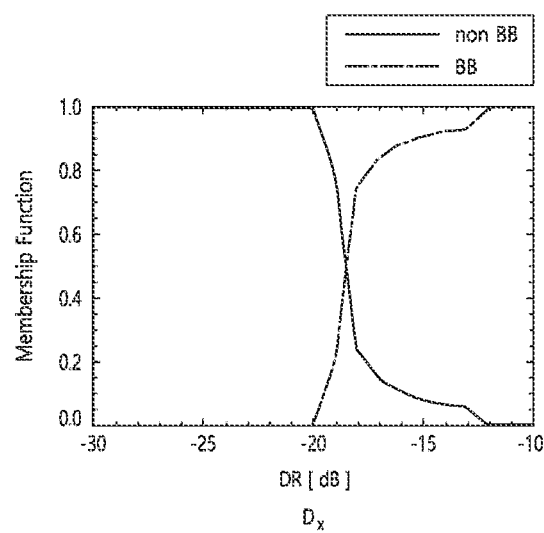

For example, the upper and lower portions of the bright band extracted from the quasi-vertical profile may be used by the bright band region identification unit 135 to classify the bright band region and the non-bright band region. Referring to FIG. 4, a region from the upper portion to the lower portion (hatched region) was set as the bright region, and a region including a region from a height of 1.5 km to the lower portion minus five gates and a region from the upper portion plus five gates to the maximum range was set as the non-bright region.

The weighting determination unit 137 may calculate a membership function MF of each characteristic variable from the normalized frequency distribution and determine a weighting from the membership function. The membership function MF for each bright band characteristic variable may be calculated from the normalized frequency distribution as in Equation 5 below.

$$MF_{BB}(i) = \frac{F_{BB}(i)}{F_{nonBB}(i) + F_{BB}(i)} \quad \text{[Equation 5]}$$

Here, F (i) is the normalized frequency distribution, MF(i) is the membership function, and i refers to the characteristic variables Z, $Z_{DR}$, $\rho_{hv}$, and $D_r$. FIGS. 5A-5D show a membership function for each variable, and a total of seven stratified-cloud-type precipitation cases were used to calculate the membership function. A weighting W (i) for each characteristic variable may be calculated using a membership function as shown in Equation 6 below.

$$W(i) = \frac{1}{A} / \sum_{i=1}^{4} \frac{1}{A_i} \qquad \text{[Equation 6]}$$

Here, Ai refers to the area of an overlapping region between the bright band membership function and the non-bright band membership function.

The bright band detection unit 150 detects a bright band using a fuzzy classifier and a total membership value/temperature profile for each sector.

Figure 6:
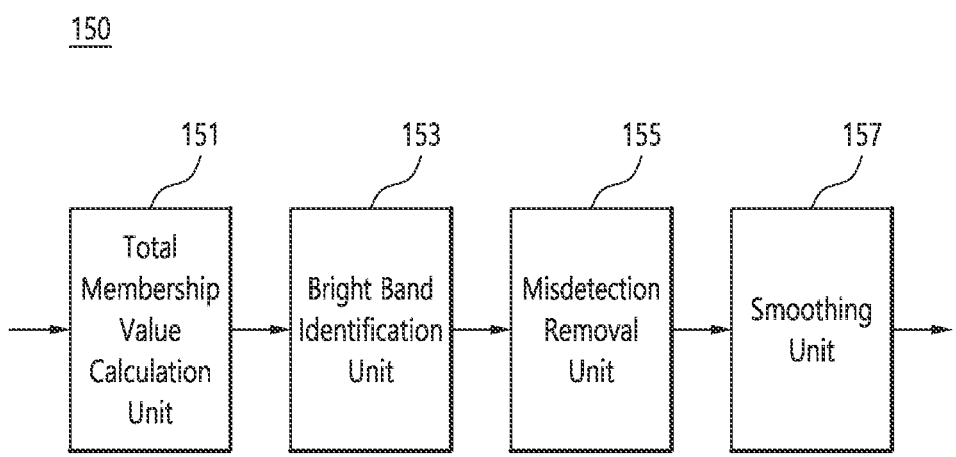
FIG. 6 is a detailed block diagram of a bright band detection unit of FIG. 1.

FIG. 6 is a block diagram of a bright band detection unit using a fuzzy classifier. The bright band detection unit 150 calculates the degree of contamination (total membership value) caused by the bright band of the observation data based on the fuzzy classifier generated by the fuzzy classifier generation unit 130 and determines the bright band using the total membership value and $D_r$. Also, the bright band detection unit 150 removes regions misdetected as bright bands due to non-weather echo (sea clutter, etc.) or low-quality observation data using the sector-based total membership value/temperature average profile and applies a median value filter to smooth the bright band detection result.

To this end, the bright band detection unit 150 may include a total membership value calculation unit 151, a bright band determination unit 153, a misdetection removal unit 155, and a smoothing unit 157.

The total membership value may be calculated by the total membership value calculation unit 151 using a weighting for each variable as in Equation 7 below.

$$MV_{total} = \frac{\sum MV_i \times W_i}{\sum W_i} \qquad \text{[Equation 7]}$$

Figure 7:
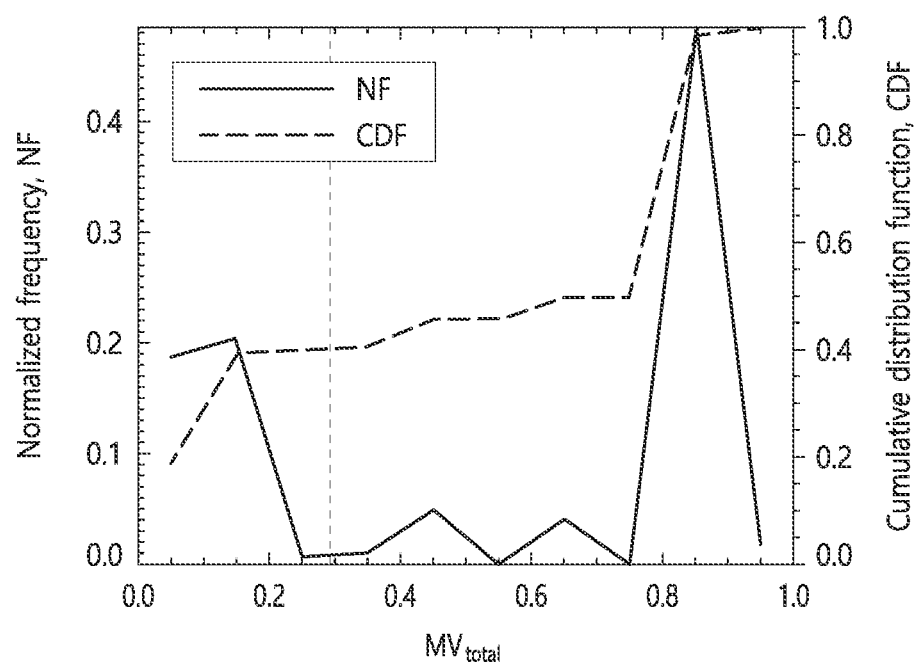
FIG. 7 is a diagram showing the distribution of total membership values in the bright band region.

FIG. 7 shows the distribution of total membership values in the bright band region detected by the quasi-vertical profile of reflectivity for a total of five precipitation cases. In the bright band region, most of the total membership values were distributed between 0.7 and 1.0, and 0.3 was determined as a threshold value for bright band detection. A value of 0.3 or less is a region where $\rho_{hv}$ is high in the quasi-vertical profile. In the quasi-vertical profile, there is a region which is included as the bright band region and where $\rho_{hv}$ is high.

In order to solve this drawback, the bright band determination unit 153 detects a bright band by using a fuzzy classifier in a region where $\rho_{hv}$ is low and by using $D_r$ in a region where $\rho_{hv}$ is high.

The bright band determination unit 153 detects a bright band using a $D_r$ threshold value and a fuzzy classifier developed for grid-based bright band detection. In this case, the fuzzy logic and $D_r$ are applied depending on the range of $\rho_{hv}$.

For example, when the total membership value is 0.3 or more for a region where $\rho_{hv}$ is 0.97 or more and when $D_r$ is −20 dB or more for a region where $\rho_{hv}$ exceeds 0.97, the region may be classified as a bright band.

In the distribution of SNR and $\rho_{hv}$ according to elevation angles, $\rho_{hv}$ is low due to beam blockage in low SNR regions at low elevation angles, and $\rho_{hv}$ is low in a snow region at high elevation angles. As the elevation angle increases, the position of the bright band gets closer to the radar. Accordingly, in order to distinguish the bright band from the beam blockage or the snow region, when a region has a reflectivity of 15 dBZ or more or has an SNR threshold value or more according to a distance from the radar as in Equation 8 below, the region may be detected as a bright band.

$$SNR_{threshold} = 70.0 - 25.0 \times \log_{10}(\text{range} + 15.0) \qquad \text{[Equation 8]}$$

Here, range refers to a distance (km) from the radar.

Also, when the temperatures $T_{btop}$ of the top of the radar beam and the temperature $T_{bbot}$ of the bottom of the radar beam are lower than 10° C. and higher than −10° C. in order to limit possible bright bands, respectively, the region may be detected as a bright band.

The misdetection removal unit 155 removes a misdetected region using a total membership value/temperature average profile on a section basis.

A bright band detection algorithm is highly dependent on $\rho_{hv}$ and $D_r$ values. A non-weather echo (sea clutter echo, etc.) with a low $\rho_{hv}$ value, which uses data after quality management as input data but is not removed from quality management, is misdetected as a bright band. To solve this problem, a misdetected region is removed using a total membership value ($\overline{MV}$) profile and a temperature (T) average profile.

The total membership value profile for each sector based on the azimuth at each elevation angle is generated by averaging the total membership values according to the height, and the temperature profile is generated by averaging the temperatures at the center of the radar beam according to the height.

Figure 8A:
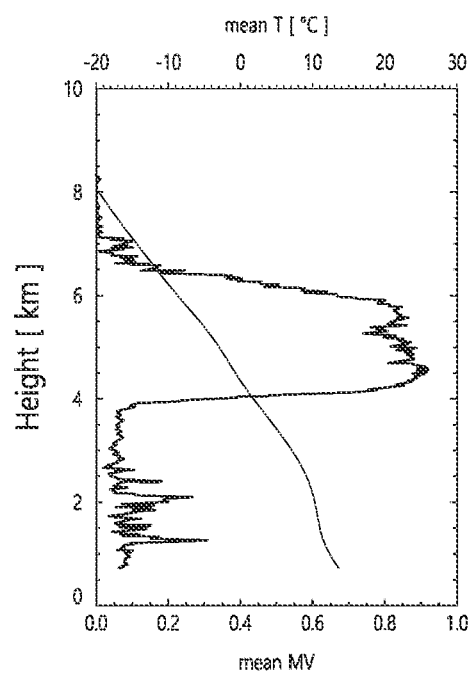
FIG. 8A is a diagram illustrating an example of a sectorwise total membership value and a temperature average profile.
Figure 8B:
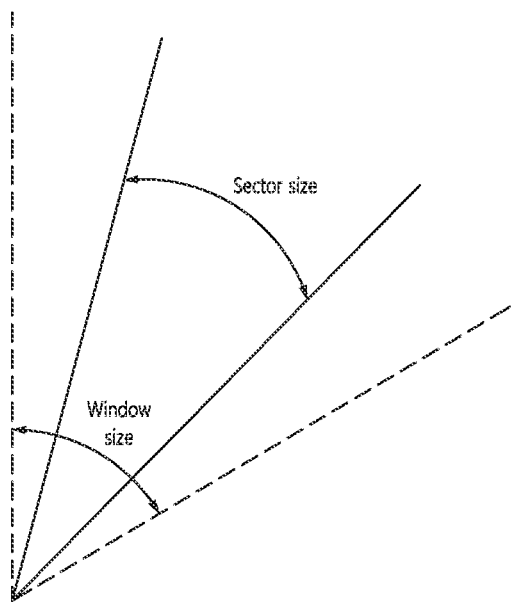
FIG. 8B is a diagram illustrating the definition of sector and window sizes.

FIG. 8A shows a sectorwise total membership value and a temperature average profile, and FIG. 8B shows a sector size and a window size. The window size refers to a calculation range for the total membership value and the temperature average profile, and the sector size refers to an application range for threshold values. In order to reduce observation noise when creating a bright band profile, the window size may be set to be wider than the sector size.

In an embodiment, a height at which the average total membership value $\overline{MV}$ is maximum at a high elevation angle of 3° or more at which bright bands are mainly concentric circles may be set as a reference height $H_{ref}$, and a first height at which $\overline{MV}$ is less than 0.2 may be set as an upper (lower) height of the bright band. Also, after a height at which the average temperature $\overline{T}$ is 0° C. at a low elevation angle of less than 3° is determined as the reference height $H_{ref}$, the upper (lower) height of the bright band may be set as a height which is 1.0 km higher (lower) than the reference height and at which the average of the total membership values is less than or equal to 0.2.

Also, in order to reduce the misdetection of bright bands in snow cases, when within a height at which $\overline{T}$ ranges from −5° C. to 5° C. regardless of the elevation angle, the maximum value of $\overline{MV}$ is less than 0.2 and $\overline{T}$ is below zero at the $10^{th}$ bin, a snow case may be determined, and the upper height may be reset as the $10^{th}$ bin.

Accordingly, it is possible to improve a phenomenon in which the remaining non-precipitation echo at low elevation angles in addition to the sea clutter echo is misdetected as a bright band. According to the present invention, a low-quality double polarization variable causes bright bands to be misdetected, and this can be improved by applying the total membership value/temperature average profile.

The smoothing unit 157 smoothes the bright band detection result by applying a median filter. Here, the median filter is applied to remove a point echo type detection result.

For example, when there is less than 50% of the echo within the window of five gates (3°×5 gates) in an azimuth on both sides with respect to a corresponding gate, this may be classified as a non-bright band (NBB). When there is more than 50% of the echo within the window, this may be replaced with a median.

The reflectivity correction unit 170 corrects the over-observation of reflectivity in the bright band region with a correction factor calculated using the apparent profile of reflectivity.

Figure 9:
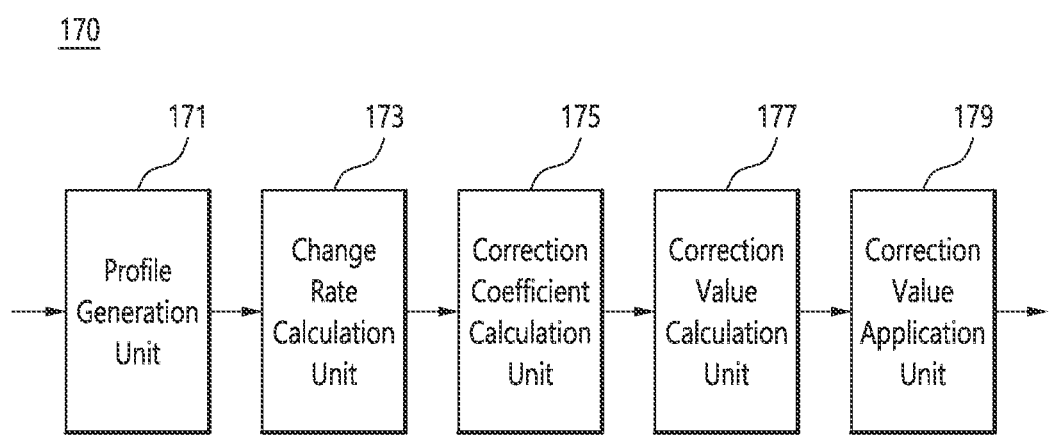
FIG. 9 is a detailed block diagram of a reflectivity correction unit of FIG. 1.

FIG. 9 is a block diagram of a reflectivity correction unit using the bright band detection result of the bright band detection unit 150. Referring to FIG. 9, the reflectivity correction unit 170 includes a profile generation unit 171, a change rate calculation unit 173, a correction factor calculation unit 175, a correction value calculation unit 177, and a correction value application unit 179.

The reflectivity correction unit 170 calculates a reflectivity correction factor by calculating a reflectivity variation from an apparent profile obtained by averaging reflectivity in a region contaminated by bright bands. The reflectivity correction unit 170 applies the calculated correction factor to the observed reflectivity to correct the over-observation of reflectivity due to bright bands.

The profile generation unit 171 generates an apparent vertical profile of reflectivity (AVPR) in order to correct the over-observation of reflectivity due to bright bands. The AVPR was generated by averaging reflectivity data in a bright band region for each elevation angle. In this case, the reflectivity may be averaged only when the number of bright band echoes compared to precipitation echoes at a corresponding distance is, for example, 10% or more.

Figure 10A:
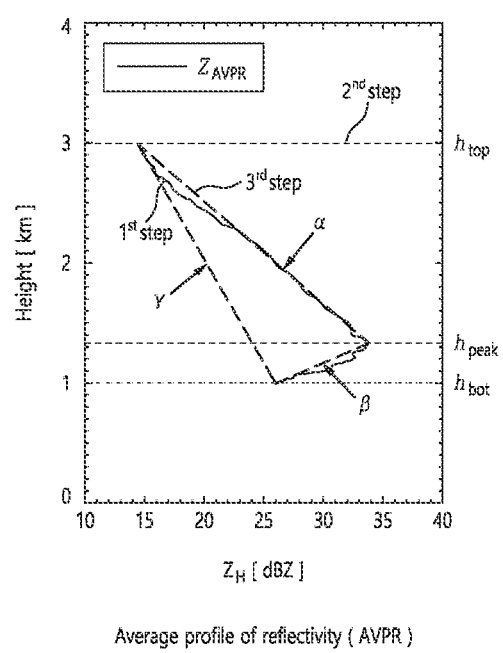
FIG. 10A is a diagram showing an apparent profile of reflectivity.

FIG. 10A is an example of the AVPR, and a height at which the reflectivity is most strong in the AVPR and the $\rho_{hv}$ value of the bright band region is less than or equal to 0.97 was defined as a bright band peak height $h_{peak}$, and the uppermost height and the lowermost height in the AVPR were defined as $h_{top}$ and $h_{bottom}$, respectively.

The change rate calculation unit 173 may calculate the amounts of change in reflectivity (or reflectivity slopes) in a region $\alpha$ between the upper portion of the bright band and the peak, a region $\beta$ between the peak and the lower portion, and a region $\gamma$ between the upper portion and the lower portion as a function of height using the least-squares method.

The correction factor calculation unit 175 may calculate a reflectivity correction factor CF using Equation 9 and Equation 10 on the basis of a bright band peak for a region detected as a bright band. When $h_{peak}$ is less than 1.5 km and the thickness of the upper portion is greater than the thickness of the lower portion, the lower portion of the bright band not observed at all is determined, and the correction factor calculation unit 175 may calculate the CF using the AVPR and the reflectivity of the bright band peak.

Figure 10B:
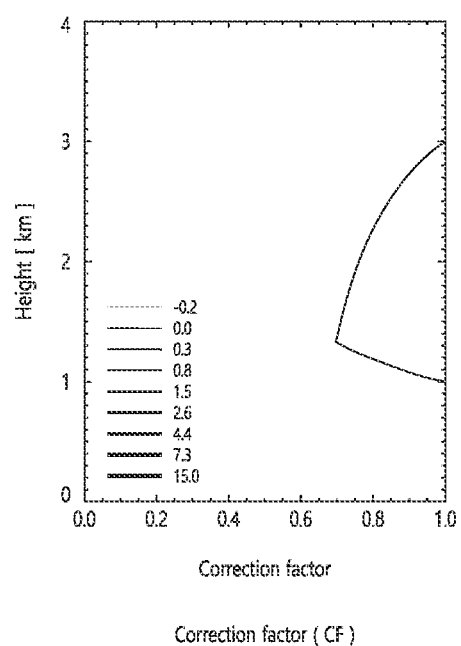
FIG. 10B is a diagram showing an example of calculating a correction factor.
Figure 11:
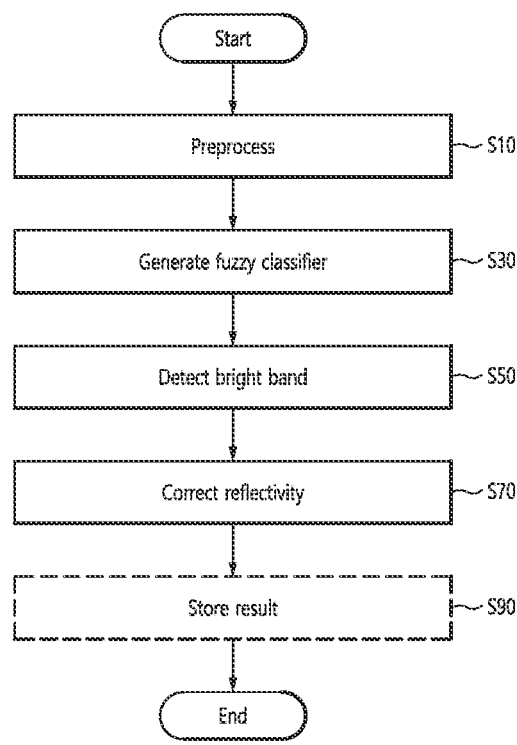
FIG. 11 is a flowchart of a reflectivity correction method using a double polarization variable-based bright band detection result according to an embodiment of the present invention.

The correction value calculation unit 177 corrects the reflectivity in a region detected as a bright band, as in FIG. 11, using the calculated CF for each height. Therefore, the reflectivity is not corrected when a CF is 1, and the correction rate is high when a CF is low (FIG. 10B). The reflectivity correction value $\Delta Z$ is calculated as the difference between the observed reflectivity $Z_{measured}$ and the corrected reflectivity $Z_{corrected}$ as in Equation 12.

The correction value application unit 179 applies the calculated correction value to the observed reflectivity. When the bright band height is significantly different for each azimuth, an AVPR may be generated for each sector on the basis of the CF and the radar azimuth, and the reflectivity may be corrected by repeating the same process for each sector.

if $h_{peak} < 1.5$ km and $h_{peak} - h_{bottom} < h_{top} - h_{peak}$ [Equation 9]

$$CF(h) = \frac{Z_{top}}{AVPR(h)}$$

else $$CF(h) = \frac{Z_{bot} + \gamma(h - h_{bot})}{Z_{bot} + \beta(h - h_{bot})}(h \leq h_{peak})$$

$$CF(h) = \frac{Z_{top} - \alpha(h_{bot} - h)}{Z_{top} - \gamma(h_{top} - h)}(h > h_{peak})$$ [Equation 10]

$$Z_{corrected} = Z_{measured} * CF(h)$$ [Equation 11]

$$\Delta Z = Z_{corrected} - Z_{measured}$$ [Equation 12]

$$CF(h) = \frac{Z_{top} - \alpha(h_{bot} - h)}{Z_{top} - \gamma(h_{top} - h)}(h > h_{peak})$$ [Equation 10]

$$Z_{corrected} = Z_{measured} * CF(h)$$ [Equation 11]

$$\Delta Z = Z_{corrected} - Z_{measured}$$ [Equation 12]

As a result of the bright band correction for data for elevation angles of 2.1° and 3.2° of the radar according to the present invention, the reflectivity was decreased after reflectivity correction in the reflectivity region over-observed due to bright bands, and a horizontally continuous distribution was observed.

The result storage unit 190 stores the reflectivity corrected by the reflectivity correction unit 170 and the correction value over-observation correction value $\Delta Z$ due to bright bands.

FIG. 11 is a flowchart of a reflectivity correction method using a double polarization variable-based bright band detection result according to an embodiment of the present invention.

The reflectivity correction method using a double polarization variable-based bright band detection result according to this embodiment may be performed in substantially the same configuration as the apparatus 10 of FIG. 1. Accordingly, the same element as that of the apparatus 10 of FIG. 1 is given the same reference numeral, and repeated descriptions thereof will be omitted.

Also, the reflectivity correction method using a double polarization variable-based bright band detection result according to this embodiment may be executed by software (application) for performing reflectivity correction using the double polarization variable-based bright band detection result.

The present invention analyzes the double polarization variable characteristics of bright bands, detects a region contaminated by the bright bands in radar volume data, and corrects the over-observed Z data.

Referring to FIG. 11, the reflectivity correction method using the double polarization variable-based bright band detection result according to this embodiment includes performing a preprocessing process for correcting a double polarization variable observation error and calculating a depolarization ratio (operation S10).

Thus, the preprocessing operation (operation S10) may include operations of correcting a power loss rate through blockage for reflectivity and differential reflectivity, performing rain attenuation correction for reflectivity and differential reflectivity, correcting a cross-correlation coefficient using a signal-to-noise ratio (SNR), and calculating a depolarization ratio on the basis of the cross-correlation coefficient and the differential reflectivity.

When the preprocessing is completed, double polarization variables in a bright band region and a non-bright band region are analyzed using bright band heights extracted from the quasi-vertical profile generated from specific elevation angle data, and a membership function and a weighting of each characteristic variable are calculated to generate a fuzzy classifier (operation S30). Here, the characteristic variables may include reflectivity Z, differential reflectivity $Z_{DR}$, a cross-correlation coefficient $\rho_{hv}$, and a depolarization ratio $D_r$.

The operation of generating a fuzzy classifier (operation S30) may include operations of generating a quasi-vertical profile from specific elevation angle data having a certain elevation angle or higher, extracting a bright band height from the generated quasi-vertical profile, distinguishing a bright band and a non-bright band on the basis of the bright band height, and calculating a membership function MF of each characteristic variable from a normalized frequency distribution and determining a weighting from the membership function.

When the fuzzy classifier is generated, a bright band is detected using the weighting of each characteristic value, the depolarization ratio, the total membership value for each sector, and a temperature profile (operation S50).

Figure 12:
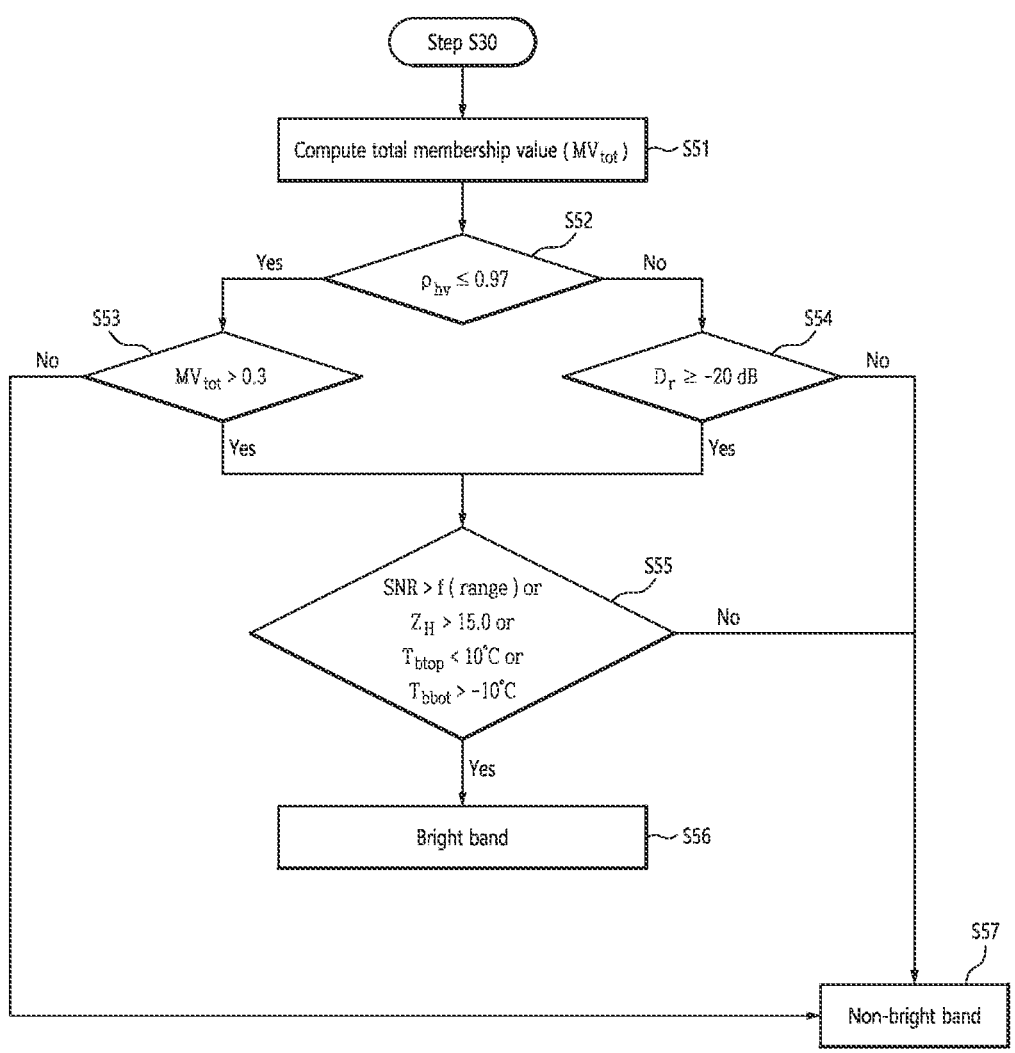
FIGS. 12 and 13 are detailed flowcharts illustrating a bright band detection operation of FIG. 11.

Referring to FIG. 12, first, the operation of detecting a bright band (operation S50) includes calculating a total membership value indicating the degree of contamination due to a bright band of observation data by using the weighting of each characteristic variable (operation S51).

A bright band is determined using the total membership value and the depolarization ratio (operation S51). For example, when the cross-correlation coefficient is less than or equal to a preset first threshold (e.g., 0.97) (operation S52), when the total membership value exceeds a preset second threshold (e.g., 0.3) (operation S53), when the cross-correlation coefficient exceeds the first threshold (step S52), and when the depolarization ratio is greater than or equal to a preset third threshold (e.g., 20), it is possible to identify bright band candidates (operations S54). In other cases, a non-bright band is determined (operation S57).

Then, when the SNR exceeds a preset fourth threshold value according to a distance from a radar, when the reflectivity exceeds a preset fifth threshold value (e.g., 15.0), when the temperature of the upper portion of the radar beam is less than a preset sixth threshold value (e.g., 10° C.), or when the temperature of the lower portion of the radar beam exceeds a preset seventh threshold value (e.g., −10° C.) (operation S55), a bright band may be determined among the bright band candidates (operation S56). In other cases, a non-bright band is determined (operation S57).

After the bright band is determined, it is possible to remove a misdetected region using a total membership value profile generated by averaging the sectorwise total membership values according to the height on the basis of the azimuth at each elevation angle and a temperature average profile obtained by averaging the temperatures of the center of the radar beam according to the height.

Figure 13:
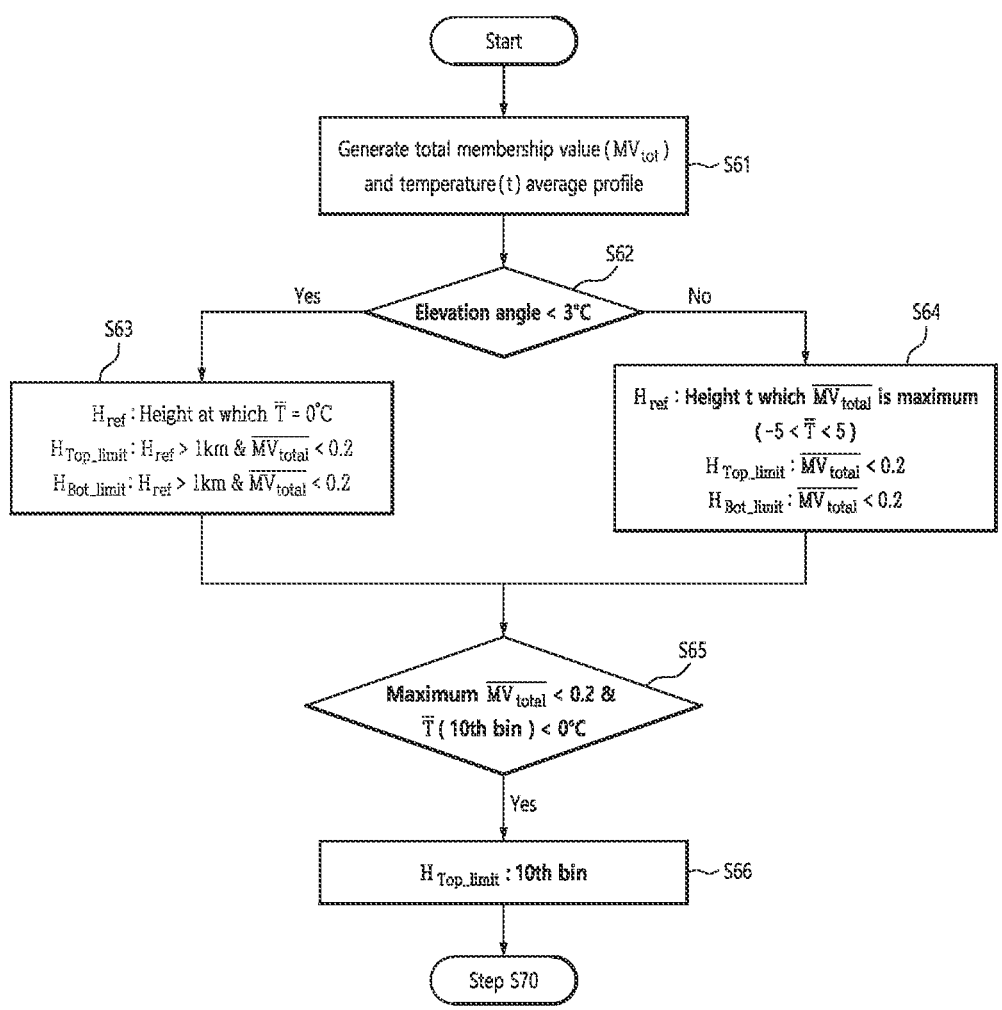

Referring to FIG. 13, the operation of removing the misdetected region includes generating the total membership value profile obtained by averaging the sectorwise total membership values according to the height at each elevation angle and the temperature average profile by averaging the temperatures of the center of the radar beam according to the height (operation S61).

By setting a height at which the average total membership value is maximum as a reference height for a high elevation angle greater than or equal to a preset value (e.g., 3°), a first height at which the average total membership value is less than a preset eighth threshold value (e.g., 0.2) may be set as the upper and lower heights of the bright band (operation S64). By setting a height at which the average temperature is 0° C. as a reference height for a lower elevation angle less than a preset value (operation S62), the upper and lower heights of the bright band may be set as a height which is higher or lower than the reference height by a preset height and at which the total membership value average is less than the eighth threshold value (e.g., 0.2) (operation S63).

Also, when the maximum value of the average total membership value is less than the eighth threshold value within a height at which an average temperature is within a certain range regardless of elevation angles and the average temperature is below zero at a specific distance (operation S65), the corresponding height (e.g., the tenth bin) may be reset as the upper height (operation S66).

It is possible to smooth the bright band detection result by applying a median filter after removing the misdetected region.

The reflectivity over-observation for the detected bright band region is corrected based on the correction factor calculated using the apparent profile of reflectivity generated by averaging reflectivity data of the bright band region for each elevation angle (operation S70).

Figure 14:
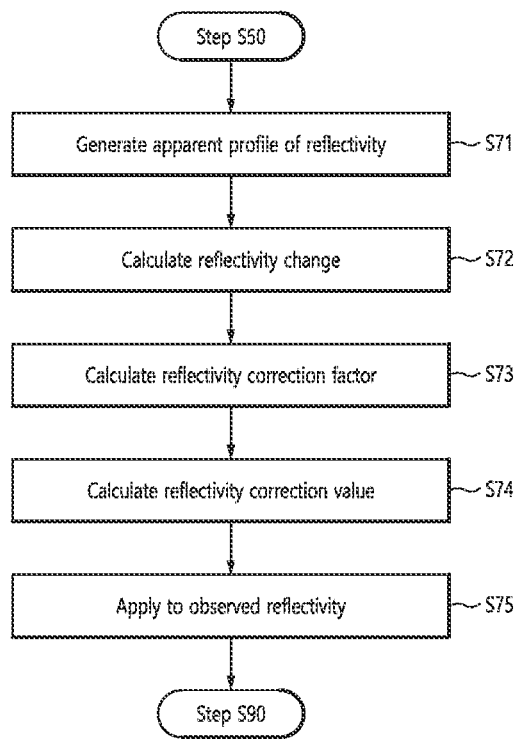
FIG. 14 is a detailed block diagram illustrating a reflectivity correction operation of FIG. 11.

Referring to FIG. 14, the reflectivity correction operation (operation S70) includes generating the apparent profile of reflectivity by averaging the reflectivity data of the bright band region when the ratio of the bright band echo to the precipitation echo for each elevation angle is greater than or equal to a certain ratio (operation S71).

The reflectivity slopes for the region between the upper portion of the bright band and the peak, the region between the peak and the lower portion, and the region between the upper portion and the lower portion as a function of height are calculated from the apparent profile (operation S72), and the reflectivity correction factor is calculated based on the peak of the bright band for a region detected as a bright band (operation S73).

The reflectivity correction value, which is the difference between the observed reflectivity and the corrected reflectivity, may be calculated based on the calculated correction factor (operation S74), and the calculated correction value may be applied to the observed reflectivity (operation S75).

Also, the reflectivity correction method using the double-polarization variable-based bright band detection result may further include a result storage operation of storing corrected reflectivity and corrected reflectivity value (operation SS90).

In the present invention, a depolarization ratio calculated using a double polarization variable was added to the fuzzy classifier and utilized for bright band detection, and the bright band detection accuracy was improved by using the total membership value/temperature profile. Also, a bright band correction technique using the apparent profile of reflectivity was developed.

The reflectivity correction method using the double polarization variable-based bright band detection result may be implemented as an application or implemented in the form of program instructions that can be executed by various computer elements and then may be recorded on a computer-readable recording medium. The computer-readable recording medium may include program instructions, data files, data structures, and the like alone or in combination.

The program instructions recorded on the computer-readable recording medium may be designed and configured specially for the present invention or may be publicly known and usable by those skilled in the field of computer software.

Examples of the computer-readable recording medium include magnetic media such as a hard disk, a floppy disk, and a magnetic tape, optical media such as a compact disc-read only memory (CD-ROM) and a digital versatile disc (DVD), magneto-optical media such as a floptical disk, and hardware devices such as a ROM, a random access memory (RAM), and a flash memory, which are specially designed to store and execute program instructions.

Examples of the computer instructions include not only machine language code generated by a compiler, but also high-level language code executable by a computer using an interpreter or the like. The hardware devices may be configured to operate as one or more software modules in order to perform operations of the present invention, and vice versa.

Although the present invention has been described with reference to exemplary embodiments, it will be understood that various changes and modifications may be made herein without departing from the scope and spirit of the present invention defined in the appended claims.

INDUSTRIAL APPLICABILITY

Since weather radar data is used as important data in rain estimation, live prediction, hydrometeorology, etc., it can be usefully used in the field of meteorological and disaster prevention services, civil engineering, and hydrology, etc. In addition, the prospects for marketability and commercialization are bright due to the high interest in the corresponding technique in order to secure high-accuracy radar data in related private institutions and academia.

The invention claimed is:

1. A reflectivity correction method using a double polarization variable-based bright band detection result, the reflectivity correction method comprising:
   correcting a double polarization variable observation error and calculating a depolarization ratio by a pre-process processor;
   generating a fuzzy classifier and analyzing double polarization variables in a bright band and a non-bright band using a height of a bright band extracted from a quasi-vertical profile generated from each of a plurality of elevation angles and calculating a weighting and a membership function of each of the double polarization variables;
   detecting a bright band, by a bright band detection processor, using the depolarization ratio and the fuzzy classifier for each of the plurality of elevation angles, wherein the detecting the bright band comprises determining the bright band including identifying bright band candidates when a cross-correlation coefficient is less than or equal to a preset first threshold value and a total membership value exceeds a preset second threshold value, and when the cross-correlation coefficient exceeds the first threshold value and the depolarization ratio is greater than or equal to a preset third threshold value; and
   correcting reflectivity over-observation for the bright band based on a correction factor calculated using an apparent profile of reflectivity generated by averaging reflectivity data for the bright band for the each of the plurality of elevation angles.

2. The reflectivity correction method of claim 1, wherein the generating the fuzzy classifier and the analyzing the double polarization variables in the bright band comprises:
   generating the quasi-vertical profile from the each of the plurality of elevation angles that are higher or equal to a certain elevation angle;
   extracting the height of the bright band from the quasi-vertical profile;
   distinguishing the bright band region and the non-bright band region based on the height of the bright band; and
   calculating the membership function of the each of the double polarization variables from a normalized frequency distribution and determining the weighting from the membership function.

3. The reflectivity correction method of claim 1, wherein the detecting the bright band comprises:
   calculating the total membership value indicating a degree of contamination due to the bright band of observation data using the weighting of the each of the double polarization variables, wherein the total membership value is calculated by using an equation 7:

$$MV_{total} = \frac{\sum MV_i \times W_i}{\sum W_i} \qquad \text{[Equation 7]}$$

wherein
   the $MV_{total}$ is the total membership value and
   the $W_i$ is the weighting for each of the double polarization variables by using an overlapping region between a first membership function for the bright band a second membership function for the non-bright band, and
   wherein the total membership value, mostly ranging from 0.7 to 1.0, is detected in the bright band, with 0.3 set as a threshold for the detecting the bright band;
   determining the bright band using the total membership value and the depolarization ratio;
   removing a misdetected region using a total membership value profile generated by averaging, by height, sectorwise total membership values based on an azimuth at the each of the plurality of elevation angles and a temperature average profile obtained by averaging, by height, temperatures of a center of a radar beam; and
   smoothing the bright band by applying a median filter.

4. The reflectivity correction method of claim 3, wherein the determining the bright band further comprises determining, among the bright band candidates, the bright band in which a signal-to-noise ratio (SNR) exceeds a preset fourth threshold value according to a distance from a radar, in which a reflectivity exceeds a preset fifth threshold value, in which a temperature of an upper portion of the radar beam is less than a preset sixth threshold value, or in which a temperature of a lower portion of the radar beam exceeds a preset seventh threshold value.

5. The reflectivity correction method of claim 3, wherein the removing the misdetected region comprises:
   generating the total membership value profile by averaging, by height, the sectorwise total membership values based on the azimuth at the each of the plurality of elevation angles and generating the temperature average profile by averaging, by height, the temperatures of the center of the radar beam;

setting a height at which an average total membership value is maximum for a high elevation angle greater than or equal to a preset value as a reference height, and setting a first height at which the average total membership value is less than a preset first threshold value as upper and lower heights of the bright band; and setting a height at which the average temperature is 0° C. for a low elevation angle less than a preset value as a reference height, and setting the upper and lower heights of the bright band as heights which are higher or lower than the reference height by a preset height and at which the total membership value average is less than the preset first threshold value.

6. The reflectivity correction method of claim 5, wherein the removing the misdetected region further comprises resetting the upper height when the average temperature is below zero at a specific distance and the maximum of the average total membership values is less than the preset first threshold value within a height at which the average temperature is in a certain range regardless of the each of the plurality of elevation angles.

7. The reflectivity correction method of claim 1, wherein the correcting reflectivity over-observation further comprises:
generating the apparent profile of reflectivity by averaging the reflectivity data of the bright band when a ratio of a bright band echo to a precipitation echo for the each of the plurality of elevation angles is greater than or equal to a certain ratio;
calculating reflectivity slopes for a first region between an upper portion of the bright band and a peak, a second region between the peak and a lower portion, and a third region between the upper portion and the lower portion as a function of height from the apparent profile;
calculating a reflectivity correction factor based on the peak of the bright band for the bright band;
calculating a reflectivity correction value, which is a difference between a first reflectivity which is observed and a second reflectivity which is corrected based on the reflectivity correction factor; and
applying the calculated correction value to the first reflectivity which is observed.

8. The reflectivity correction method of claim 1, further comprising storing a second reflectivity which is corrected and a reflectivity correction value by a result storage processor.

9. A non-transitory computer-readable storage medium having a computer program recorded thereon for performing the reflectivity correction method using a double polarization variable-based bright band detection result of claim 1.

10. A reflectivity correction apparatus using a double polarization variable-based bright band detection result, the reflectivity correction apparatus comprising:
a preprocessing processor configured to correct a double polarization variable observation error and calculate a depolarization ratio;
a fuzzy classifier generation processor configured to generate a membership function and a weighting of each of the double polarization variables by using a height of the bright band extracted from a quasi-vertical profile generated from each of a plurality of elevation angles;
a bright band detection processor configured to detect the bright band by using the depolarization ratio and a total membership value for the each of the plurality of elevation angles, wherein the bright band detection processor includes a bright band determination processor configured to identify bright band candidates when a cross-correlation coefficient is less than or equal to a preset first threshold value and the total membership value exceeds a preset second threshold value, and when the cross-correlation coefficient exceeds the first threshold value and the depolarization ratio is greater than or equal to a preset third threshold value and wherein the total membership value is calculated by using an equation 7:

$$MV_{total} = \frac{\sum MV_i \times W_i}{\sum W_i}$$ [Equation 7]

wherein the $MV_{total}$ is the total membership value and the $W_i$ is the weighting for each of the double polarization variables by using an overlapping region between a first membership function for the bright band a second membership function for a non-bright band, and wherein the total membership value, mostly ranging from 0.7 to 1.0, is detected in the bright band, with 0.3 set as a threshold for the detecting the bright band; and a reflectivity correction processor configured to correct reflectivity over-observation for the bright band based on a correction factor calculated by using an apparent profile of reflectivity generated by averaging reflectivity data for the bright band for the each of the plurality of elevation angles.

11. The reflectivity correction apparatus of claim 10, wherein the preprocessing processor comprises:
a beam blockage correction processor configured to correct power loss due to blockage for reflectivity and differential reflectivity;
a rain attenuation correction processor configured to perform rain attenuation correction on the reflectivity and the differential reflectivity;
a $\rho_{hv}$ correction processor configured to correct a cross-correlation coefficient using a signal-to-noise ratio (SNR); and
a $D_r$ calculation processor configured to calculate the depolarization ratio based on the cross-correlation coefficient and the differential reflectivity.

12. The reflectivity correction apparatus of claim 10, wherein the fuzzy classifier generation processor comprises:
a QVP generation processor configured to generate the quasi-vertical profile from the each of the plurality of elevation angles that are higher or equal to for a certain elevation angle;
a bright band height extraction processor configured to extract the height of the bright band from the quasi-vertical profile;
a bright band identification processor configured to distinguish a bright band and a non-bright band based on the height of the bright band; and
a weighting determination processor configured to calculate the membership function of the each of the double polarization variables from a normalized frequency distribution and determine the weighting from the membership function.

13. The reflectivity correction apparatus of claim 10, wherein the bright band detection processor comprises:
- a total membership value calculation processor configured to calculate the total membership value indicating a degree of contamination due to the bright band of observation data using the weighting of the each of the double polarization variables;
- a bright band determination processor configured to determine the bright band using the total membership value and the depolarization ratio;
- a misdetection removal processor configured to remove a misdetected region using a total membership value profile generated by averaging, by height, sectorwise total membership values based on an azimuth at the each elevation angle and a temperature average profile obtained by averaging, by height, temperatures of a center of a radar beam; and
- a smoothing unit configured to smooth a bright band detection result by applying a median filter.

14. The reflectivity correction apparatus of claim 13, wherein the bright band determination processor is configured to determine, among the bright band candidates, the bright band in which a signal-to-noise ratio (SNR) exceeds a preset fourth threshold value according to a distance from a radar, in which a reflectivity exceeds a preset fifth threshold value, in which a temperature of an upper portion of the radar beam is less than a preset sixth threshold value, or in which a temperature of a lower portion of the radar beam exceeds a preset seventh threshold value.

15. The reflectivity correction apparatus of claim 13, wherein the misdetection removal processor is configured to:
- generate the total membership value profile by averaging, by height, the sectorwise total membership values based on the azimuth at the each of the plurality of elevation angles and generating the temperature average profile by averaging, by height, the temperatures of the center of the radar beam;
- set a height at which an average total membership value is maximum for a high elevation angle greater than or equal to a preset value as a reference height, and set a first height at which the average total membership value is less than a preset first threshold value as upper and lower heights of the bright band;
- set a height at which the average temperature is 0° C. for a low elevation angle less than a preset value as a reference height, and set the upper and lower heights of the bright band as heights which are higher or lower than the reference height by a preset height and at which the total membership value average is less than the preset first threshold value; and
- reset the upper height when the maximum of the average total membership value is less than the preset first threshold value and the average temperature is below zero at a specific distance, within a height at which the average temperature is in a certain range regardless of elevation angles.

16. The reflectivity correction apparatus of claim 10, wherein the reflectivity correction processor comprises:
- a profile generation processor configured to generate the apparent profile of reflectivity by averaging the reflectivity data of the bright band region when a ratio of a bright band echo to a precipitation echo for the each elevation angle is greater than or equal to a certain ratio;
- a change rate calculation processor configured to calculate reflectivity slopes for a first region between an upper portion of the bright band and a peak, a second region between the peak and a lower portion, and a third region between the upper portion and the lower portion as a function of height from the apparent profile;
- a correction factor calculation processor configured to calculate a reflectivity correction factor based on the peak of the bright band for the bright band;
- a correction value calculation processor configured to calculate a reflectivity correction value, which is a difference between a first reflectivity which is observed and a second reflectivity which is corrected based on the reflectivity correction factor; and
- a correction value application processor configured to apply the correction value to the first reflectivity.

17. The reflectivity correction apparatus of claim 10, further comprising a result storage processor configured to store a second reflectivity and a reflectivity correction value.

18. A reflectivity correction method using a double polarization variable-based bright band detection result, the reflectivity correction method comprising:
- correcting a double polarization variable observation error and calculating a depolarization ratio by a preprocess processor, wherein the correcting the double polarization variable observation error and the calculating the depolarization ratio comprises:
  - correcting power loss due to blockage for reflectivity and differential reflectivity;
  - performing rain attenuation correction on the reflectivity and the differential reflectivity;
  - correcting a cross-correlation coefficient using a signal-to-noise ratio (SNR); and
  - calculating the depolarization ratio based on the cross-correlation coefficient and the differential reflectivity;
- generating a fuzzy classifier and analyzing double polarization variables in a bright band and a non-bright band, by a fuzzy classifier generation processor, using a height of the bright band extracted from a quasi-vertical profile generated from each of a plurality of elevation angles and calculating a weighting and a membership function of each of the double polarization variables;
- detecting a bright band, by a bright band detection processor, using the depolarization ratio and the fuzzy classifier generation processor for each of a plurality of elevation angles; and
- correcting reflectivity over-observation for the bright band based on a correction factor calculated using an apparent profile of reflectivity generated by averaging reflectivity data for the bright band for the each of the plurality of elevation angles.

* * * * *